United States Patent [19]

Sirrine

[11] B  4,000,366

[45] Dec. 28, 1976

[54] ADAPTIVE GRAY SCALE CONTROL CIRCUIT FOR TELEVISION VIDEO SIGNALS

[75] Inventor: Edwin B. Sirrine, S. Wichita, Kans.

[73] Assignee: The United States of America as represented by the Secretary of the Air Force, Washington, D.C.

[22] Filed: Mar. 25, 1975

[21] Appl. No.: 561,770

[44] Published under the second Trial Voluntary Protest Program on March 16, 1976 as document No. B 561,770.

[52] U.S. Cl. .................................. 358/171; 358/164; 307/235 K; 328/163

[51] Int. Cl.² .................. H04N 5/197; H04N 5/58

[58] Field of Search .......... 178/DIG. 34, 7.1, 7.3 R, 178/7.3 DC, 7.5 DC, DIG. 16; 307/235 K; 328/127, 162, 163, 147, 187

[56] References Cited

UNITED STATES PATENTS 3,670,100   6/1972   Briggs et al. ........................ 178/7.1

3,790,706   2/1974   Gubala et al. ...................... 178/7.1

*Primary Examiner*—John Zazworsky

*Attorney, Agent, or Firm*—Joseph E. Rusz; Willard R. Matthews, Jr.

[57] ABSTRACT

Television picture "wash-out" is eliminated by means of a signal processing circuit that adapts and enhances the video gray scale of television pictures to compensate for adverse lighting conditions in the viewed area. The circuit approach comprehends processing the video signal in terms of picture area. Each step on the gray scale from black to white is assigned a percentage of the total picture. The circuit comprises a plurality of comparators each working at a different threshold level. Each comparator is followed by an integrator and a feedback circuit that adapts that comparator sense level to the incoming signal. The video signal is processed in a way that always produces certain assigned ratios of black, white, and/or shades of gray.

1 Claim, 2 Drawing Figures

ADAPTIVE GRAY SCALE CONTROL CIRCUIT FOR TELEVISION VIDEO SIGNALS

STATEMENT OF GOVERNMENT INTEREST

The invention described herein may be manufactured and used by or for the Government for governmental purposes without the payment of any royalty thereon.

BACKGROUND OF THE INVENTION

This invention relates to television picture enhancement, and in particular to means for controlling the gray scale of television video signals.

Video pictures with present television systems tend to become washed-out when there are bright lights in the viewed area or when part of the viewed area is much more brightly lit than other parts, or in certain other adverse lighting conditions. It has been common practice to vary the gain control by mechanical or electrical means in order to compensate for such conditions. This approach, however, results in the aforementioned washed-out effect on the television picture. Compressing or removing the extreme parts of the signal by means of limiters is another state-of-the-art solution to the problem. Unfortunately this method destroys the details in the picture. There currently exists, therefore, the need for means that will compensate for the effects of bright and uneven lighting in the viewed area of television pictures without introducing wash-out effects and without sacrificing picture detail. The present invention is directed toward satisfying such a need.

SUMMARY OF THE INVENTION

Compensation for the adverse effect of bright and uneven lighting in the viewed area of television pictures is achieved by means of an adaptive gray scale control circuit for the television video signal. Implementation of the invention is accomplished by providing a plurality of comparators that produce a positive or negative output depending on the magnitude of the video signal. Each comparator works at a different level. Each comparator is followed by an integrator that adapts that comparator sense level to the incoming signals so that comparator output is always positive the selected percentage of the time. The feedback from each integrator adjusts the corresponding comparator threshold to compensate for signal (picture) characteristics. Each integrator is biased with a DC input current that determines the percentage of time the corresponding comparator output will be positive.

It is a principal object of the invention to provide a new and improved adaptive gray scale control circuit for television video signals.

It is another object of the invention to provide apparatus for compensating for the adverse effects of bright and unevenly distributed lighting in the viewed area of television pictures that does not degrade picture detail.

These, together with other objects, features and advantages of the invention, will become more readily apparent from the following detailed description when taken in conjunction with the illustrative embodiment in the accompanying drawings.

DETAILED DESCRIPTION OF THE PREFERRED EMBODIMENT

Figure 1:
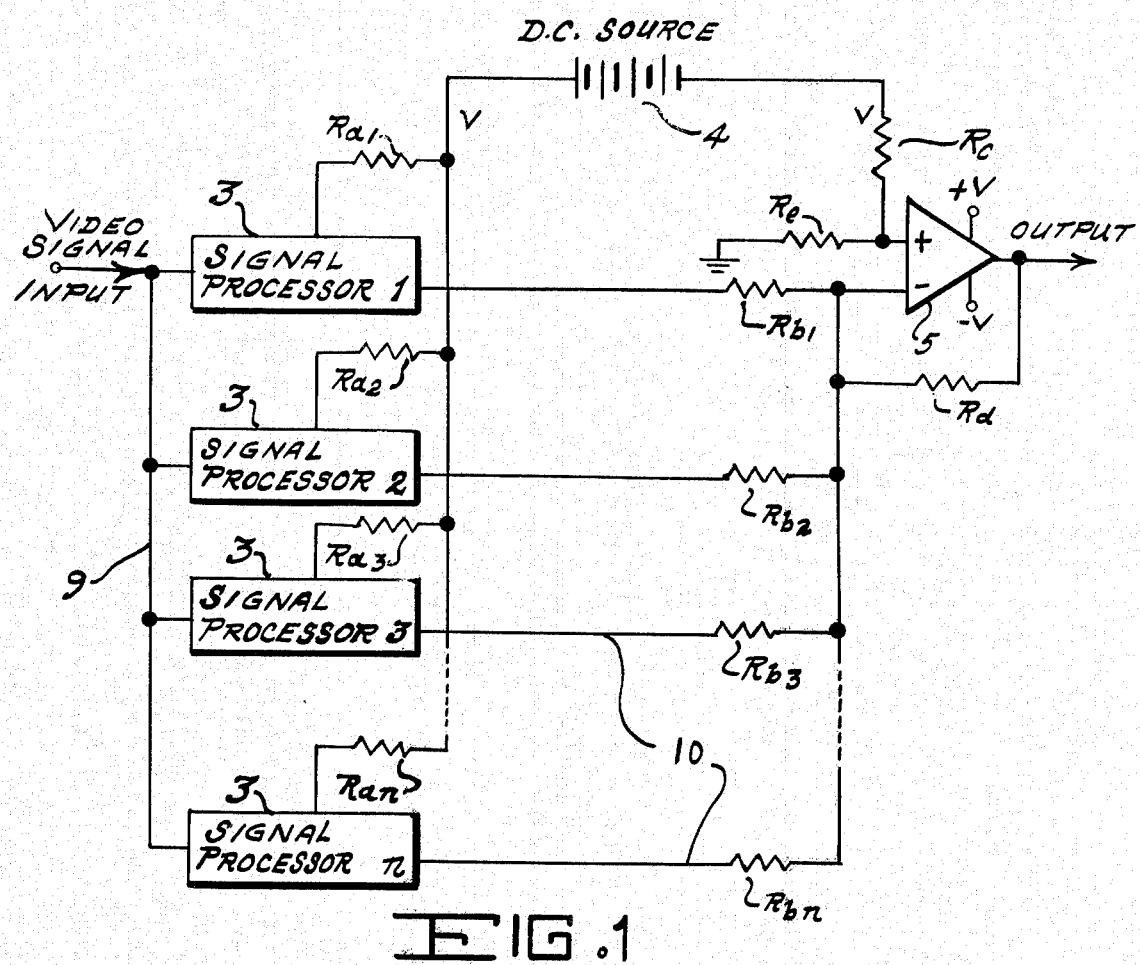
FIG. 1 is a block diagram of the adaptive gray scale control circuit comprehended by the invention.
Figure 2:
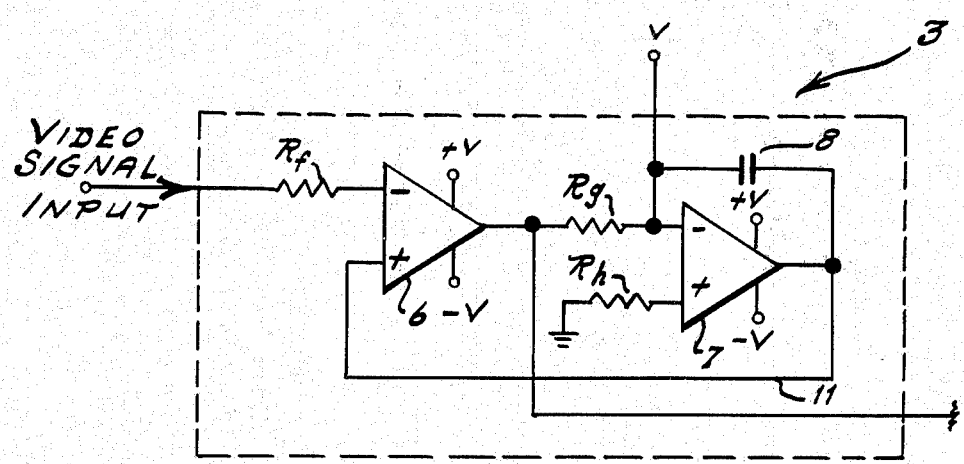
FIG. 2 is a detailed schematic diagram of one signal processor stage of the circuit of FIG. 1.

An adaptive gray scale control circuit for television video signal that incorporates the principles of the invention is illustrated in detail in FIGS. 1 and 2. The circuit comprises a multiplicity of signal processors 3, output summing amplifier 5, DC bias source 4, video signal input circuit 9, and signal processor output circuit 10. Although no fixed number of signal processor stages are required it has been determined that eleven stages will handle system SYNC pulses and produce a high resolution picture. Signal processor output circuit 10 includes a resistor in each processor output ($R_{b1}$–$R_{bn}$). The individual resistance values of resistors $R_{b1}$ through $R_{bn}$ are selected to determine the desired contrast between each shade of gray. Resistance $R_{a1}$ through $R_{an}$ together with ±V determine the percentage of time the resulting picture will be a particular shade of gray. Resistors $R_c$ and $R_e$ provide bias for DC restoration of the signal. Resistor $R_d$ provides the gain determination for summing amplifier 5. Signal processor details are shown by the schematic diagram of FIG. 2. Each signal processor comprises a comparator 6, signal isolation resistor $R_f$, amplifier 7, amplifier bias resistor $R_h$, feedback circuit 11, and an integrator consisting of resistor $R_g$ and capacitor 8. The resistance and capacitance values of resistor $R_g$ and capacitor 8 determine the integrator time constant. It has been determined that an operable device can be designed using an integrator time constant of 0.1 seconds.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. An adaptive gray scale control circuit for television video signals comprising
   a multiplicity of signal processors, each signal processor including
      a comparator having first and second inputs and an output,
      an amplifier having an input and an output,
      a capacitor connected between the input and output of said amplifier, and
      resistance means, the output of said comparator being connected to the input of said amplifier through said resistance means and the output of said amplifier being connected to said second comparator input,
   means for simultaneously applying a video signal to the first comparator input of each signal processor,
   means for providing a discrete DC bias to the amplifier input of each signal processor,
   an output summing amplifier having an input and an output, and
   a circuit connecting the comparator output of each signal processor to the input of said output summing amplifier, said circuit including means for weighting the value of each comparator output signal.

* * * * *